US012460599B2

(12) United States Patent
Sliwa

(10) Patent No.: US 12,460,599 B2
(45) Date of Patent: Nov. 4, 2025

(54) CRANKCASE AND INTERNAL COMBUSTION ENGINE WITH SUCH A CRANKCASE

(71) Applicants: DEUTZ Aktiengesellschaft, Cologne (DE); Deere & Company, Moline, IL (US)

(72) Inventor: Marco Sliwa, Siegburg (DE)

(73) Assignees: DEUTZ Aktiengesellschaft, Cologne (DE); Deere & Company, Moline, IL (US)

( * ) Notice: Subject to any disclaimer, the term of this patent is extended or adjusted under 35 U.S.C. 154(b) by 0 days.

(21) Appl. No.: 18/426,910

(22) Filed: Jan. 30, 2024

(65) Prior Publication Data

US 2024/0254941 A1 Aug. 1, 2024

(30) Foreign Application Priority Data

Jan. 31, 2023 (DE) ......................... 102023000277.1

(51) Int. Cl.
*F02F 1/00* (2006.01)
*F02F 7/00* (2006.01)

(52) U.S. Cl.
CPC .......... *F02F 7/0007* (2013.01); *F02F 7/0021* (2013.01); *F02F 2200/06* (2013.01)

(58) Field of Classification Search
CPC .. F02F 2200/06; F02F 2200/00; F02F 7/0007; B24B 1/00
USPC ...................................................... 123/193.2
See application file for complete search history.

(56) References Cited

U.S. PATENT DOCUMENTS 1,694,642 A * 12/1928 Edwards ................. F02B 63/04 123/41.67
11,548,604 B1 * 1/2023 Misorski ................ B63H 21/38
2013/0061885 A1 3/2013 Treutmann
2015/0345994 A1 * 12/2015 Mase ..................... G01D 11/30 324/207.21
2018/0003127 A1 * 1/2018 Sakurai ................... B23B 35/00
2022/0397077 A1 * 12/2022 Gaiselmann .............. F02F 1/18

FOREIGN PATENT DOCUMENTS

DE 10 2010 007224 A1 8/2011

* cited by examiner

*Primary Examiner* — Logan M Kraft
*Assistant Examiner* — James J Kim
(74) *Attorney, Agent, or Firm* — Davidson Kappel LLC

(57) ABSTRACT

A crankcase for an internal combustion engine, including a cast body made of a cast material, a cylinder bore which is formed into the cast body along a cylinder axis and which is delimited by a cylinder track, and a cylinder run-in surface of the cast body. The cylinder track merges into the cylinder run-in surface. The cylinder track is formed by the cast material in a machined state. The cylinder run-in surface is formed by the cast material in an unmachined state.

14 Claims, 7 Drawing Sheets

CRANKCASE AND INTERNAL COMBUSTION ENGINE WITH SUCH A CRANKCASE

CROSS REFERENCE TO RELATED APPLICATION

This claims the benefit of a German Patent Application DE 102023000277.1, filed on Jan. 31, 2023 which is hereby incorporated by reference herein.

TECHNICAL FIELD

The present disclosure relates to a crankcase for an internal combustion engine and an internal combustion engine with such a crankcase.

BACKGROUND

Crankcases of internal combustion engines include the cylinders and the crankshaft bearings. Thus, crankcases can also be called cylinder crankcases. Due to the combustion forces in the cylinder, the movement of the pistons in the cylinders and the bearing reaction forces in the crankshaft bearings, crankcases are heavily loaded in a variety of ways. Accordingly, the crankcases must be designed in such a way that the stress on the crankcase resulting from the respective loads is reduced.

From DE 10 2010 007 224 A1 a crankcase of an internal combustion engine is known, comprising a cylinder bore in a cylinder block made of cast material. The cylinder bore is delimited by a piston track, which is formed by a coating on the cast material. At one end orientated towards the crankshaft the piston track merges into a cylinder run-in surface. The cylinder run-in surface is also formed by the coating on the casting material.

SUMMARY

The present disclosure is based on the problem of providing a crankcase of an internal combustion engine that is easy to manufacture and shows reduced stress. Furthermore, the present disclosure is based on the problem of providing an internal combustion engine with such a crankcase.

To solve the problem stated above, a crankcase for an internal combustion engine is proposed, comprising: a cast body made of a cast material, a cylinder bore which is formed into the cast body along a cylinder axis and which is delimited by a cylinder track, and a cylinder run-in surface of the cast body, wherein the cylinder track merges into the cylinder run-in surface, wherein the cylinder track is formed by the cast material in a machined state, and wherein the cylinder run-in surface is formed by the cast material in an unmachined state.

The crankcase according to the present disclosure has the advantage that the cylinder bore can be formed into the cast body in a single process step, so that the manufacturing complexity of the crankcase is reduced and at the same time a stress-reduced run-in and run-out of a piston into respectively out of the cylinder bore is realized.

The cylinder run-in surface is to be understood as a surface which adjoins the cylinder bore in a direction away from the cylinder head side of the cast body, wherein this surface is arranged outside an imaginary infinite cylinder which is coaxial with the cylinder axis and which has the same base area as the cylinder bore.

In a possible embodiment of the crankcase, the cylinder run-in surface can delimit a funnel recess of the cast body, which merges into the cylinder bore. The funnel recess widens in the direction of the cylinder axis away from the cylinder bore.

In a further possible embodiment of the crankcase, the cylinder track can be formed at one end, which merges into the cylinder run-in surface, by a cylinder end section of the cast body. The cylinder run-in surface can be formed by a funnel section of the cast body. The funnel section can adjoin the cylinder end section in the direction of the cylinder axis.

At least in sections in the circumferential direction around the cylinder axis, the cylinder end section can have a material thickness that increases in the direction of the cylinder axis towards the funnel section. In other words, the cylinder end section can comprise one or more sleeve segments whose material thickness increases in the direction of the cylinder axis towards the funnel section. Another part of the cylinder end section can be formed by a cylinder bridge. It is understood that the cylinder end section can also be formed completely as a sleeve, wherein the material thickness increases in the direction of the cylinder axis towards the funnel section, at least in sections in the circumferential direction.

The funnel section can extend at least in sections in the circumferential direction around the cylinder axis. In particular, the funnel section can extend entirely around the cylinder axis. The funnel section can be limited by an outer surface on a side facing away from the cylinder end section. It is understood that the cylinder run-in surface is part of the outer surface of the funnel section. On the side facing the cylinder end section, the funnel section can merge into the cylinder end section. In particular, the outer surface of the funnel section can be convex, particularly in sections. The outer surface of the funnel section can be formed continuous and differentiable. In other words, the outer surface of the funnel section can be designed without edges.

In another possible embodiment, the cylinder track can merge into the cylinder run-in surface at a transition edge enclosing the cylinder axis. The transition edge and a longitudinal cylinder plane, which includes the cylinder axis and, in particular also further cylinder axes of the crankcase, can intersect at a first intersection point. The transition edge and a cylinder transverse plane, which is arranged orthogonally to the longitudinal axis of the cast body and includes the cylinder axis, can intersect at a second intersection point. The transition edge and the longitudinal cylinder plane can intersect at a third intersection point, which is arranged opposite the first intersection point. The first intersection point and the third intersection point can be diametrically opposed, particularly with regard to the cylinder bore.

Along the transition edge from the first intersection point to the second intersection point, the distance between the transition edge and a cylinder head side of the cast body can become smaller. The distance between the transition edge and the cylinder head side of the casting can be step-wise reduced from the first intersection point to the second intersection point.

Alternatively or in combination, the distance between the transition edge and the cylinder head side of the casting can be increased along the transition edge from the second intersection point to the third intersection point. The distance between the transition edge and the cylinder head side of the casting can step-wise increase from the second intersection point to the third intersection point.

In other words, in a longitudinal section through the cast body the transition edge can extend between a first cylinder wall and a second cylinder wall. A longitudinal section is understood to be the representation of the projection in the sectional plane. It is therefore a two-dimensional representation. In this longitudinal section, the distance between the transition edge and the cylinder head side of the cast body can become smaller from the first cylinder wall to the transverse cylinder plane in a direction parallel to a longitudinal axis of the cast body. The distance between the transition edge and the cylinder head side of the cast body can be step-wise reduced from the first cylinder wall to the transverse cylinder plane.

Alternatively or in combination, the distance between the transition edge and the cylinder head side of the cast body can be increased from the cylinder transverse plane to the second cylinder wall in the direction parallel to the longitudinal axis of the cast body. The distance between the transition edge and the cylinder head side of the cast body can step-wise increase from the cylinder transverse plane to the second cylinder wall.

In the longitudinal section through the cast body respectively the representation of the longitudinal section through the cast body, the transition edge between the first intersection point and the second intersection point can be defined by a continuous and differentiable function. In other words, the transition edge in the two-dimensional representation of the longitudinal section through the casting has a kink-free transition edge. Alternatively or in combination, in the longitudinal section through the cast body or in the representation of the longitudinal section through the cast body the transition edge between the second intersection point and the third intersection point can be defined by a continuous and differentiable function.

This means that in the longitudinal section through the casting or in the representation of the longitudinal section through the casting, the transition edge between the first intersection point and the third intersection point can be defined by a continuous and differentiable function. In other words, in the longitudinal section through the cast body or in the representation of the longitudinal section through the cast body the transition edge between the first cylinder wall and the second cylinder wall can be defined by a continuous and differentiable function.

In the longitudinal section through the cast body or in the representation of the longitudinal section through the cast body, the transition edge between the first intersection point and the third intersection point can be symmetrical with respect to the transverse plane of the cylinder. In other words, in the longitudinal section through the cast body or in the representation of the longitudinal section through the cast body, the transition edge between the first cylinder wall and the second cylinder wall can be symmetrical with respect to the transverse cylinder plane.

In a further possible embodiment, the cylinder bore can be separated from a further cylinder bore in the direction parallel to the longitudinal axis by a first cylinder wall. In the longitudinal section through the cast body, the first cylinder wall is thus arranged between the cylinder bore and the further cylinder bore. A first vent opening can be arranged in the first cylinder wall, which is limited by a vent opening surface. The cylinder run-in surface can merge continuously and edge-free into the vent opening surface of the first cylinder wall.

In one possible embodiment, the cylinder track can be formed into the cast body by machining a scale layer of the cast material after the cast body has been cast. In particular, it is conceivable that the cylinder track is formed into the scale layer by a honing process. The scale layer can be completely removed.

To solve the problem underlying the present disclosure, an internal combustion engine is also proposed which comprises a crankcase according to a previously described embodiment.

BRIEF SUMMARY OF THE DRAWINGS

A possible embodiment of a crankcase according to the present disclosure is explained below with reference to the Figures. Herein.

DETAILED DESCRIPTION

Figure 1:
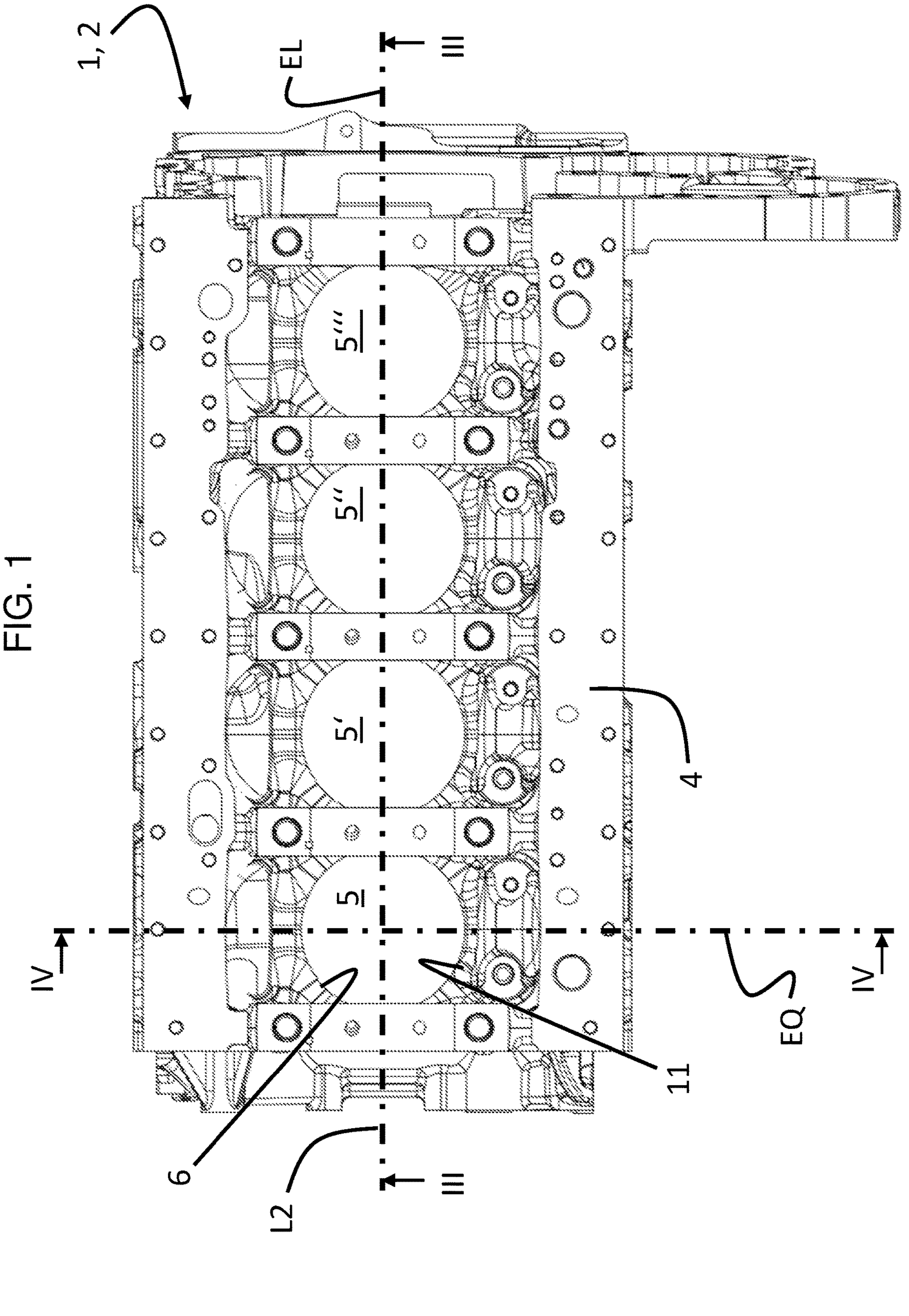
FIG. 1 is a top view of the oil pan side of a crankcase according to the present disclosure.
Figure 2:
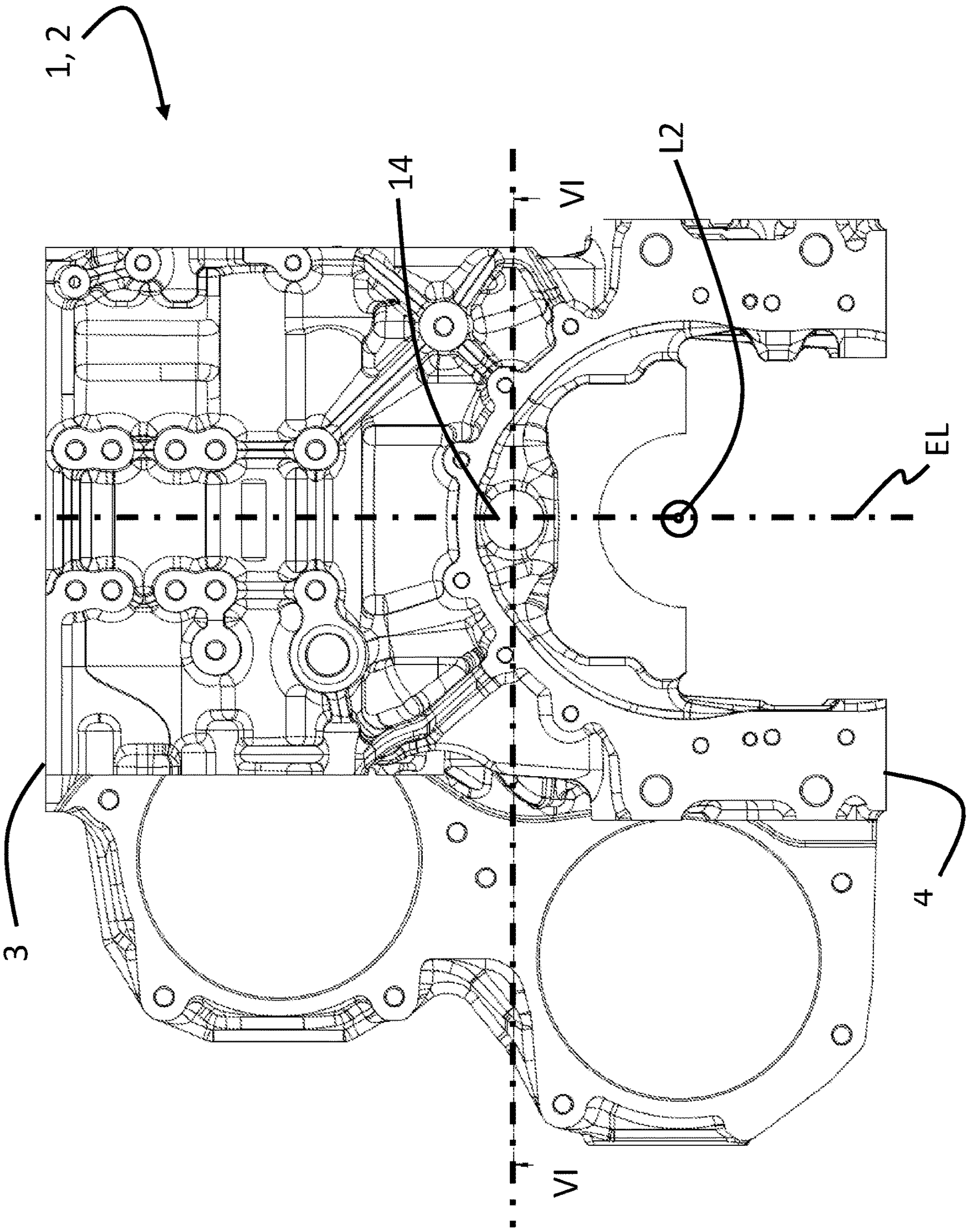
FIG. 2 is a side view of the crankcase from FIG. 1.

FIGS. 1 to 7, which are described together below, show a crankcase 1 for an internal combustion engine according to the present disclosure. The crankcase 1 comprises a cast body 2 with a cylinder head side 3 and an oil pan side 4. On the cylinder head side 3, the crankcase 1 can be connected to a cylinder head not shown. On the oil pan side 4, the crankcase 1 can be connected to bearing caps and an oil pan not shown.

A first cylinder bore 5, a second cylinder bore 5', a third cylinder bore 5'' and a fourth cylinder bore 5''' are formed in the cast body 2. The four cylinder bores 5, 5', 5'', 5''' each extend along a straight cylinder axis L5, L5', L5'', L5''' and each have a circular base. The cylinder axes L5, L5', L5'', L5''' of the four cylinder bores 5, 5', 5'', 5'' are arranged in a common longitudinal cylinder plane EL. In this respect, the crankcase shown is intended for an in-line four-cylinder internal combustion engine.

Two of the cylinder bores are separated from each other by a cylinder wall 13. The cylinder walls 13 can also be referred to as cylinder bridges. The first cylinder bore 5 and the fourth cylinder bore 5''' are delimited on the outer sides of the cast body 2 by further cylinder walls 13'. The cylinder walls 13; 13' extend essentially perpendicular to the longitudinal cylinder plane EL. The cylinder walls 13; 13' extend in a direction parallel to the cylinder axis L5 from the cylinder head side 3 of the cast body 2 to one end, which is designed as a bearing bracket for receiving the crankshaft bearing and the bearing caps.

The four cylinder bores 5, 5', 5'', 5''' are essentially the same, so that their design is described together below on the basis of the description of the first cylinder bore 5.

The first cylinder bore 5 passes through the cylinder head side 3 of the cast body 2 at one end. At an opposite end, the first cylinder bore 5 opens into a chamber in which a crankshaft can be accommodated.

The first cylinder bore 5 is delimited by a cylinder track 6. In a known manner, a piston of the internal combustion engine can run on the cylinder track 6 during movement along the cylinder axis L5. The cylinder track 6 is formed from the cast material of the cast body 2 in a machined state. For this purpose, the cylinder track 6 is formed into the cast body 2 by machining a scale layer of the casting material after the cast body has been cast. The cylinder track 6 is machined into the scale layer by honing and the scale layer is completely removed. In principle, however, it is also conceivable that the layer is only partially removed.

The first cylinder bore 5 merges into a funnel recess 8 of the cast body 2. The funnel recess 8 widens in the direction of the cylinder axis L5 away from the cylinder bore in the form of a funnel. The funnel recess 8 is designed in such a way that when the piston moves in the direction towards the bottom dead center, sections of the piston can be guided out of the first cylinder bore 5 with low wear and when the piston moves in the direction towards the top dead center, the piston can be guided fully back into the cylinder bore 5 again with low wear.

The funnel recess 8 is delimited by a cylinder run-in surface 11, which merges into the cylinder track 6 at a transition edge 12. The cylinder run-in surface 11 is arranged completely outside an imaginary infinite cylinder, which extends along the cylinder axis L5 and has the same base area as the first cylinder bore 5. The cylinder run-in surface 11 is formed from the cast material of the cast body 2 in an unmachined state.

The cylinder track 6 is formed at one end, which merges into the cylinder run-in surface 11, by a cylinder end section 7 of the cast body 2. The cylinder run-in surface 11 is formed by a funnel section 9 of the cast body 2, which adjoins the cylinder end section 7 in the direction of the cylinder axis L5. For clarification, a dashed line is drawn in FIG. 5 to separate the cylinder end section 7 from the funnel section 9. The position of the transition between cylinder end section 7 and funnel section 9 is variable over the circumference of the transition edge 12. The illustration in FIG. 5 therefore refers specifically to sectional plane IV-IV from FIG. 1.

The cylinder end section 7 of the cast body 2 comprises two ring-segment-shaped sections, each of which merges into the cylinder walls 13, 13'. It is understood that the cylindrical end section 7 of the cast body 2 can also be designed as an annular sleeve.

In the areas of the two ring-segment-shaped sections, the cylinder end section 7 has an increasing material thickness B in the direction of the cylinder axis L5 towards the funnel section 9. In this case, the material thickness B increases linearly. However, it is also conceivable that the material thickness B takes a course that deviates from linear. Due to the increasing material thickness B, the cylinder end section 7 can be connected by casting to the funnel section 9 in a stress-reduced manner and at the same time material can be saved to optimize weight.

Figure 3:
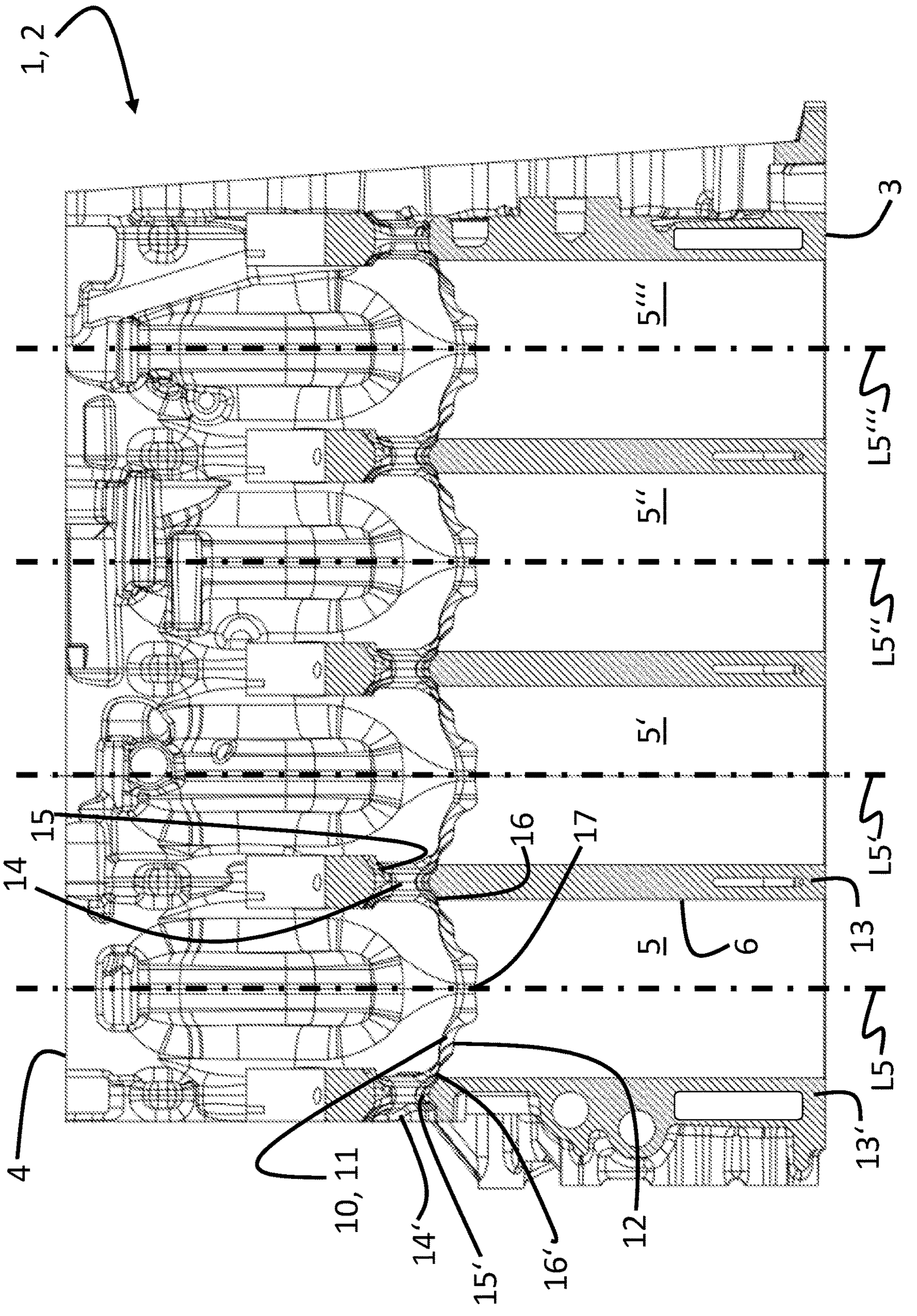
FIG. 3 is a sectional view of the sectional plane III-III from FIG. 1, wherein the sectional plane can also be referred to as the longitudinal cylinder plane.
Figure 4:
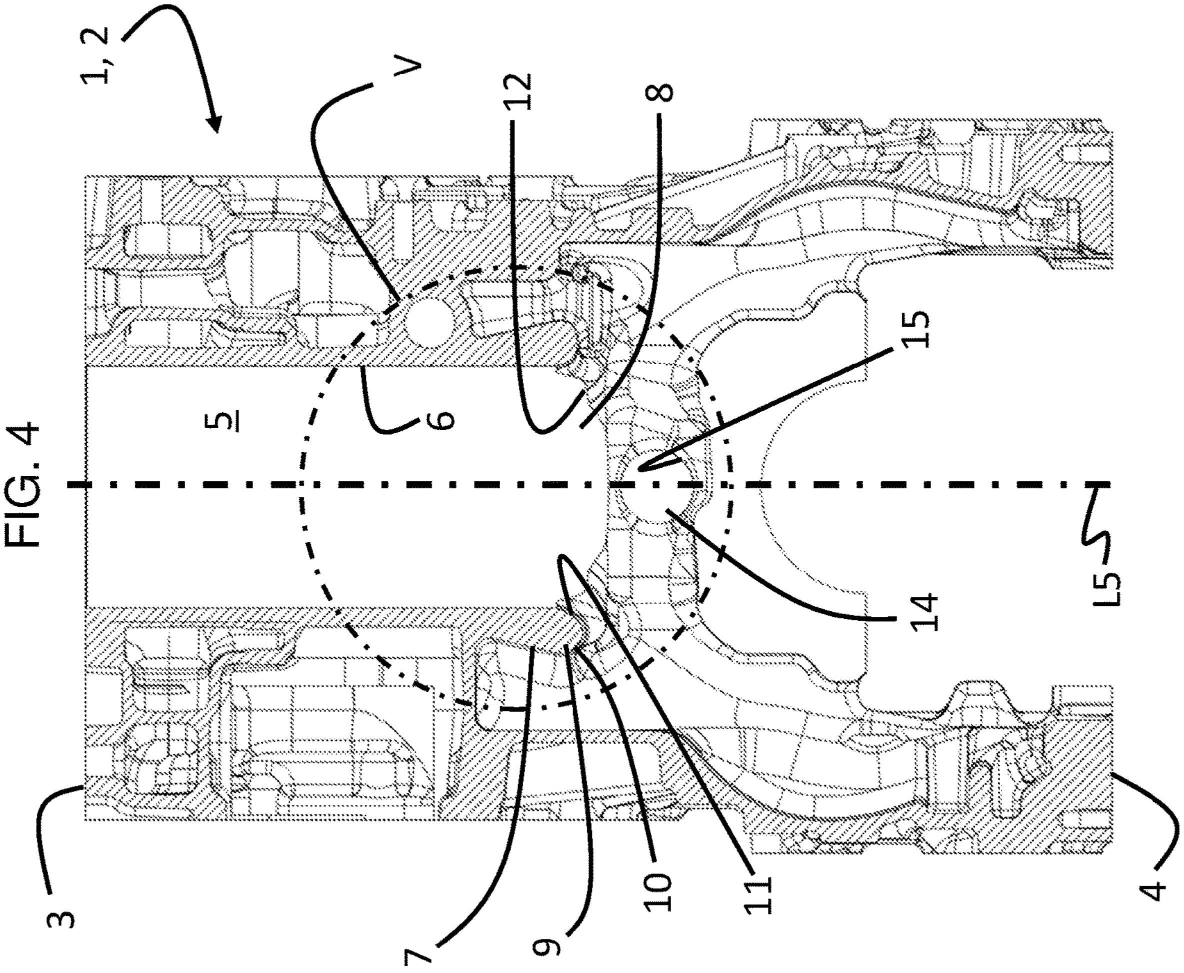
FIG. 4 is a sectional view of the sectional plane IV-IV from FIG. 1, wherein the sectional plane can also be referred to as the cylinder transverse plane of the first cylinder bore.
Figure 5:
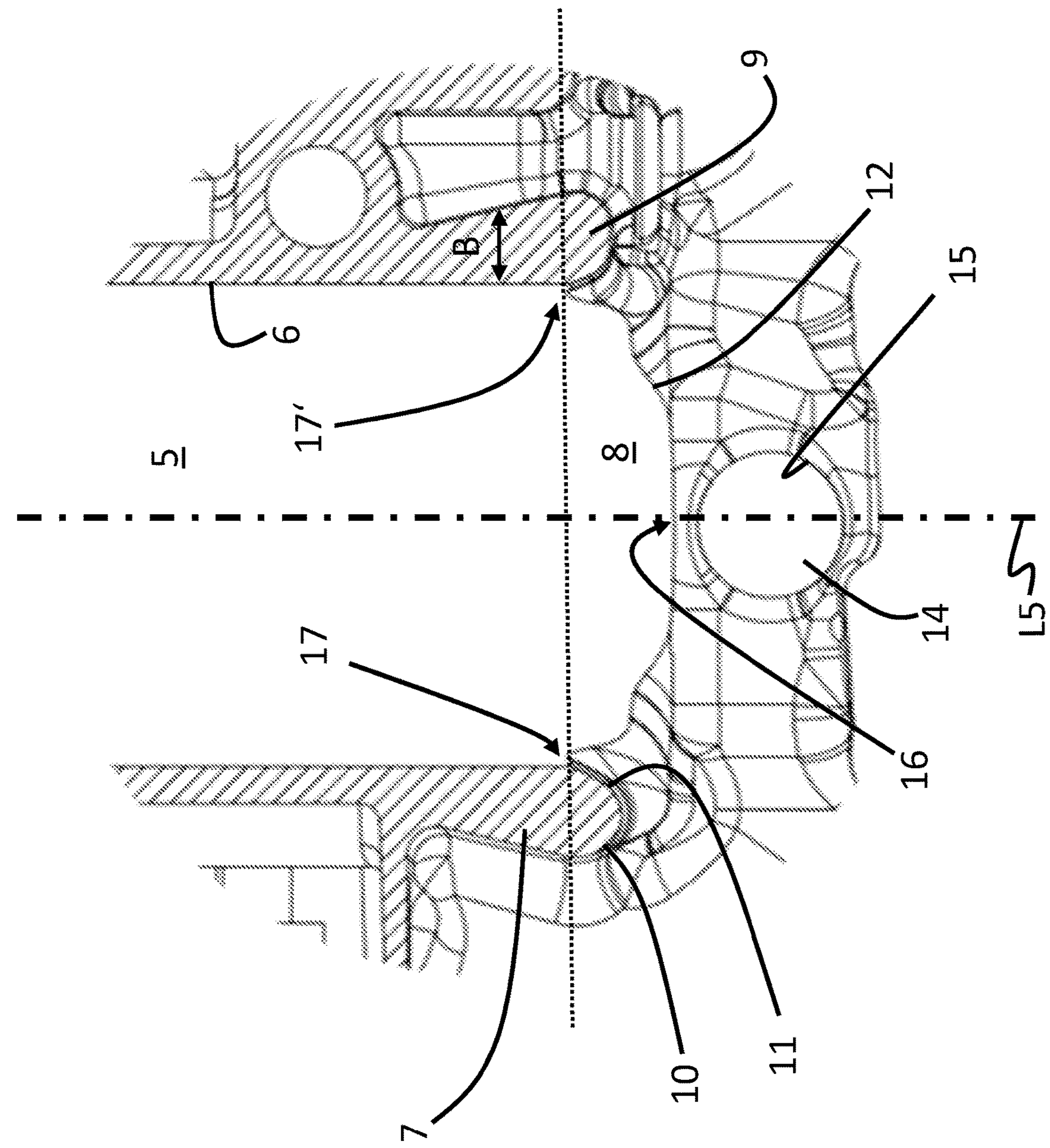
FIG. 5 is an enlarged view of detail V from FIG. 4.

The funnel section 9 has an outer surface 10 on a side facing away from the cylinder end section 7. The outer surface 10 of the funnel section 9 has no edges. In other words, the outer surface 10 of the funnel section 9 is continuous and differentiable. In the area of the annular segment-shaped sections of the cylinder end section 7, the outer surface 10 is convex in a cross-section through the cast body 2, as shown in FIG. 3. Due to the convex and edge-free design of the funnel section 9, it can be connected by casting to the cylinder end section 7 in a stress-optimized manner. As can be seen in particular in FIG. 4, the cylinder run-in surface 11 is a partial surface of the outer surface 10 of the funnel section 9.

The transition edge 12, at which the cylinder track 6 merges into the cylinder run-in surface 11, is arranged in a closed circumferential manner around the cylinder axis L5. The transition edge 12 is intersected by the longitudinal cylinder plane EL at a first imaginary intersection point 16 and a third imaginary intersection point 16'. In addition, the transition edge 12 is intersected by a cylinder transverse plane EQ, which is arranged orthogonally to the longitudinal axis L2 of the cast body 2 or orthogonally to the longitudinal cylinder plane EL and comprises the cylinder axis L5 of the first cylinder bore 5, at a second imaginary intersection point 17 and a fourth imaginary intersection point 17'.

Figure 6:
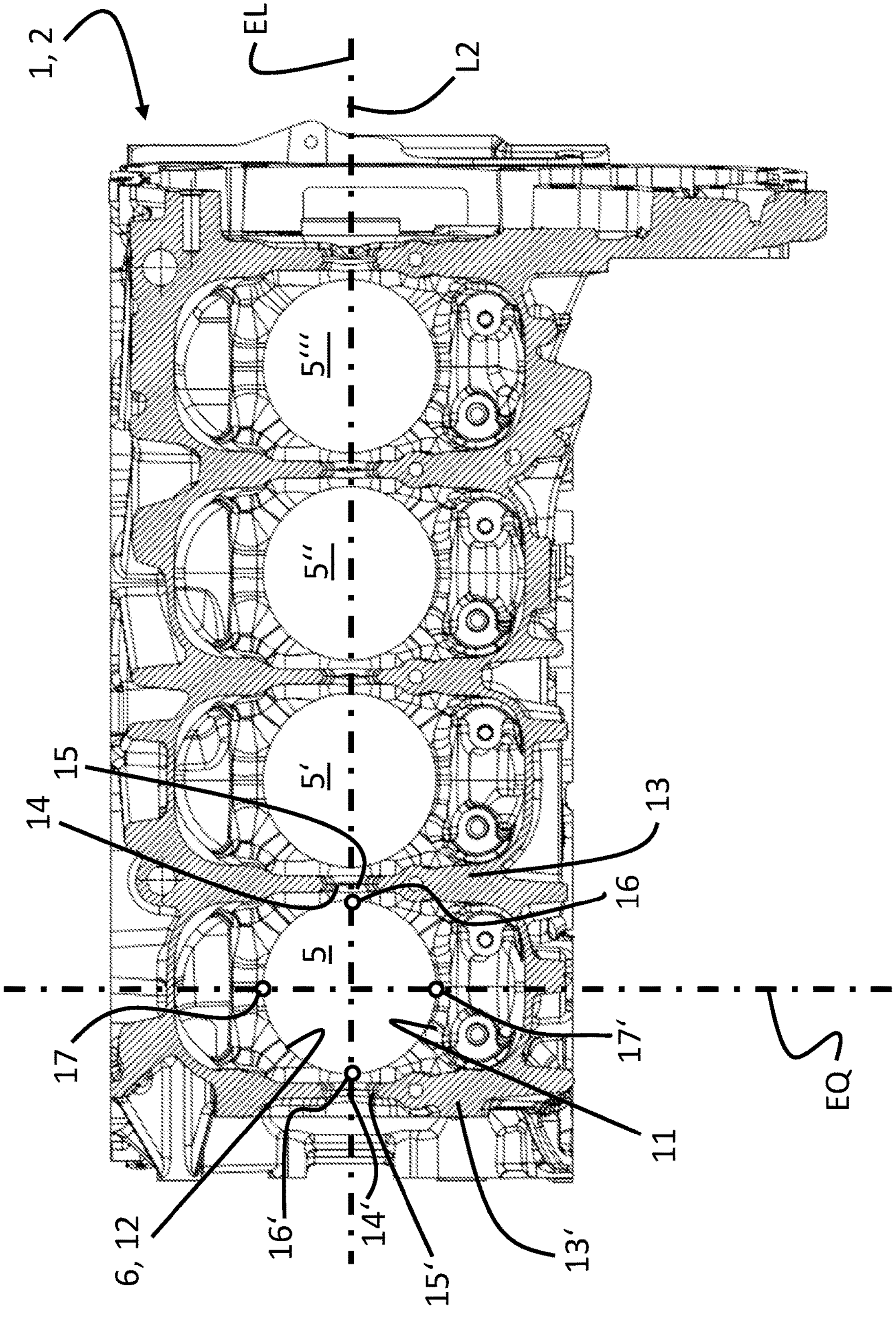
FIG. 6 is a sectional view of the sectional plane VI-VI from FIG. 2.
Figure 7:
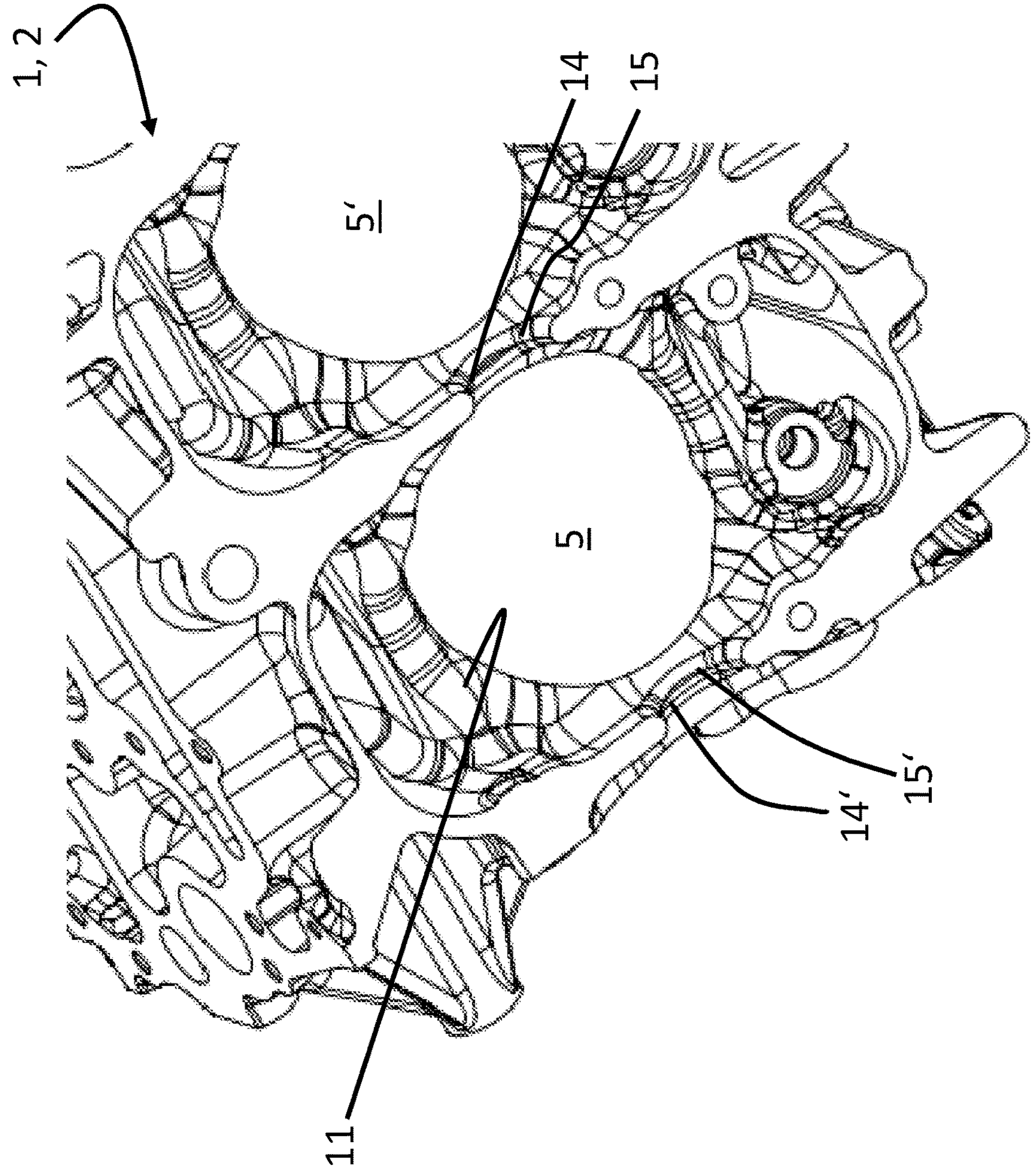
FIG. 7 is a perspective view of the crankcase cut in the sectional plane VI-VI of FIG. 2, wherein only the first cylinder bore is shown in full.

As can be seen in particular from the combination of FIG. 6 with FIG. 3, the distance between the transition edge 12 and the cylinder head side 3 of the cast body 2 becomes smaller along the transition edge 12 from the first intersection point 16 to the second intersection point 17, and the distance between the transition edge 12 and the cylinder head side 3 of the cast body 2 becomes larger again from the second intersection point 17 to the third intersection point 16'. This configuration forms a recess in the cylinder track 6 in the area of the cylinder transverse plane EQ, in which a connecting rod associated with the respective piston can pivot in and out, while at the same time increasing the effective length of the cylinder track 6 on which the piston can run between the cylinder head side 3 of the cast body 2 and the transition edge 12. This can reduce the tendency for the piston to tilt in the area of the bottom dead center of the piston movement. This in turn leads to reduced wear on the piston and the cylinder bore 6.

As can be seen in particular from FIG. 3, the distance between the transition edge 12 and the cylinder head side 3 of the cast body 2 gradually respectively step-wise decreases from the first intersection point 16 to the second intersection point 17 and gradually respectively step-wise increases again from the second intersection point 17 to the third intersection point 16'.

In a representation of a section along the longitudinal cylinder plane EL through the cast body 2, as shown in FIG. 3, the transition edge 12 is defined by a continuous and differentiable function between the first intersection point 16 and the second intersection point 17 as well as between the second intersection point 17 and the third intersection point 16'. In other words, the transition edge 12 is kink-free in both areas. This design means that the piston does not come into contact with any sharp edges when it plunges into the first cylinder bore 5, so that wear on the piston and first cylinder bore 5 is reduced, particularly when the piston is tilted.

In the representation of a section along the longitudinal cylinder plane EL through the cast body 2, as shown in FIG. 3, the transition edge 12 between the first intersection point 16 and the third intersection point 16' is symmetrical with respect to the cylinder transverse plane EQ. This results in an essentially V-shaped transition edge 12 between the cylinder wall 13 and the cylinder wall 13'. The cylinder end section 7 therefore has an increased support effect for the two cylinder walls 13, 13', so that the stress due to bearing forces acting on the respective bearing seats of the two cylinder walls 13, 13' can be reduced.

A first vent opening 14 is arranged in the cylinder wall 13, which is delimited by a vent opening surface 15. The vent opening 14 serves to equalize the pressure between the first cylinder and the second cylinder. The cylinder run-in surface 11 merges continuously and without edges into the vent opening surface 15 of the first cylinder wall 13. A second vent opening 14' is arranged in the cylinder wall 13', which is delimited by a vent opening surface 15'. The cylinder run-in surface 11 merges smoothly and without edges into the vent opening surface 15' of the cylinder wall 13'. This design reduces the notch effect in the area of the connection of the cylinder end section 7 to the cylinder walls 13, 13', so that the local stress is reduced.

LIST OF REFERENCE SIGNS

1 Crankcase
2 Cast body
3 Cylinder head side
4 Oil pan side
5 Cylinder bore
6 Cylinder track
7 Cylinder end section
8 Funnel recess
9 Funnel section
10 Outer surface
11 Cylinder run-in surface
12 Transition edge
13 Cylinder wall
14 Vent opening
15 Vent opening surface
16 Intersection
17 Intersection
B Material thickness
EL Longitudinal cylinder plane
EQ Cylinder transverse plane
L2 Longitudinal axis
L5 Cylinder axis

What is claimed is:

1. A crankcase for an internal combustion engine comprising:
- a cast body made of a cast material;
- a cylinder bore formed into the cast body along a cylinder axis, the cylinder bore being delimited by a cylinder track; and
- a cylinder run-in surface of the cast body, the cylinder track merging into the cylinder run-in surface,
- the cylinder track being formed by the cast material in a machined state, and
- the cylinder run-in surface being formed by the cast material in an unmachined state,
- wherein the cylinder run-in surface defines a funnel recess of the cast body, which merges into the cylinder bore and which widens in a direction of the cylinder axis away from the cylinder bore in a funnel shape.

2. The crankcase according to claim 1,
- wherein the cylinder track is formed at one end, which merges into the cylinder run-in surface, by a cylinder end section of the cast body,
- wherein the cylinder run-in surface is formed by a funnel section of the cast body, and
- wherein the funnel section adjoins the cylinder end section in a direction of the cylinder axis.

3. The crankcase according to claim 2, wherein a material thickness of the cylinder end section increases in the direction of the cylinder axis towards the funnel section, at least in sections in a circumferential direction around the cylinder axis.

4. The crankcase according to claim 2,
- wherein the funnel section is delimited by an outer surface on a side facing away from the cylinder end section, and
- wherein the outer surface of the funnel section is convex in sections.

5. The crankcase according to claim 1, wherein the cylinder track merges into the cylinder run-in surface at a transition edge surrounding the cylinder axis in ring-shape.

6. The crankcase according to claim 5,
- wherein the transition edge and a longitudinal cylinder plane, which comprises the cylinder axis, intersect at a first intersection point,
- wherein the transition edge and a cylinder transverse plane, which is arranged orthogonally to a longitudinal axis of the cast body and comprises the cylinder axis, intersect at a second intersection point,
- wherein the transition edge and the longitudinal cylinder plane intersect at a third intersection point, which is opposite the first intersection point,
- wherein along the transition edge from the first intersection point to the second intersection point a distance between the transition edge and a cylinder head side of the cast body becomes smaller, and/or
- wherein the distance between the transition edge and the cylinder head side of the cast body increases along the transition edge from the second intersection point to the third intersection point.

7. The crankcase according to claim 6, wherein the distance between the transition edge and the cylinder head side of the cast body becomes step-wise smaller from the first intersection point to the second intersection point.

8. The crankcase according to claim 6, wherein the distance of the transition edge from the cylinder head side of the cast body step-wise increases from the second intersection point to the third intersection point.

9. The crankcase according to claim 6,
- wherein in a longitudinal section through the cast body the transition edge between the first intersection point and the second intersection point is defined by a continuous and differentiable function; and/or
- wherein in a longitudinal section through the cast body, the transition edge between the second intersection point and the third intersection point is defined by a continuous and differentiable function.

10. The crankcase according to claim 9, wherein in the longitudinal section through the cast body, the transition edge between the first intersection point and the third intersection point is symmetrical with respect to the cylinder transverse plane.

11. The crankcase according to claim 6, wherein a first cylinder wall separates the cylinder bore from a further cylinder bore in a direction parallel to the longitudinal axis;
- wherein a first vent opening is arranged in the first cylinder wall, which is delimited by a vent opening surface; and
- wherein the cylinder run-in surface merges continuously and edge-free into the vent opening surface of the first cylinder wall.

12. The crankcase according to claim 11;
- wherein a second cylinder wall is arranged opposite the first cylinder wall;
- wherein a second vent opening is arranged in the second cylinder wall, which is delimited by a vent opening surface; and
- wherein the cylinder run-in surface merges continuously and edge-free into the vent opening surface of the second cylinder wall.

13. The crankcase according to claim 1, wherein the cylinder track is formed into the cast body by machining a scale layer of the cast material after the cast body has been cast.

14. An internal combustion engine comprising the crankcase according to claim 1.

* * * * *